(12) United States Patent
Fultheim et al.

(10) Patent No.: US 8,832,692 B2
(45) Date of Patent: *Sep. 9, 2014

(54) CLUSTER-BASED OPERATING SYSTEM-AGNOSTIC VIRTUAL COMPUTING SYSTEM

(71) Applicant: ScaleMP Inc., Cupertino, CA (US)

(72) Inventors: Shai Fultheim, Revava (IL); Herb Zlotogorski, New York, NY (US); Yaniv Romem, Jerusalem (IL)

(73) Assignee: ScaleMP Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,549

(22) Filed: Nov. 13, 2013

(65) Prior Publication Data

US 2014/0089923 A1    Mar. 27, 2014

Related U.S. Application Data

(63) Continuation of application No. 10/828,465, filed on Apr. 21, 2004.

(60) Provisional application No. 60/494,392, filed on Aug. 11, 2003, provisional application No. 60/499,646, filed on Sep. 2, 2003.

(51) Int. Cl.
*G06F 9/455* (2006.01)
*G06F 9/44* (2006.01)

(52) U.S. Cl.
CPC .......... *G06F 9/45533* (2013.01); *G06F 9/4411* (2013.01)
USPC ............................................................ 718/1

(58) Field of Classification Search
None
See application file for complete search history.

(56) References Cited

U.S. PATENT DOCUMENTS

| 4,253,145 A |   | 2/1981 | Goldberg |
| 4,475,156 A | * | 10/1984 | Federico et al. .............. 718/102 |
| 5,488,716 A |   | 1/1996 | Schneider et al. |
| 5,511,217 A |   | 4/1996 | Nakajima et al. |
| 5,553,291 A |   | 9/1996 | Tanaka et al. |
| 5,829,041 A |   | 10/1998 | Okamoto et al. |
| 5,991,893 A |   | 11/1999 | Snider |
| 6,075,938 A |   | 6/2000 | Bugnion et al. |
| 6,336,170 B1 |   | 1/2002 | Dean et al. |
| 6,397,242 B1 |   | 5/2002 | Devine et al. |
| 6,434,594 B1 | * | 8/2002 | Wesemann .................... 709/201 |
| 6,496,847 B1 |   | 12/2002 | Bugnion et al. |
| 6,542,926 B2 |   | 4/2003 | Zalewski et al. |

(Continued)

OTHER PUBLICATIONS

Hu et al., "The Memory and Communication Subsystem of Virtual Machines for Cluster Computing", Jan. 2002.

(Continued)

*Primary Examiner* — Meng An
*Assistant Examiner* — Tammy Lee
(74) *Attorney, Agent, or Firm* — D. Kliger I.P. Services Ltd.

(57) ABSTRACT

According to a disclosed embodiment of the invention, an improved cluster-based collection of computers (nodes) is realized using conventional computer hardware. Software is provided that enables at least one virtual machine to be presented to guest operating systems, wherein each node participating with the virtual machine has its own emulator or virtual machine monitor. VM memory coherency and I/O coherency are provided by hooks, which result in the manipulation of internal processor structures. A private network provides communication among the nodes.

27 Claims, 5 Drawing Sheets

(56) References Cited

U.S. PATENT DOCUMENTS

| | | |
|---|---|---|
| 6,601,183 B1 | 7/2003 | Larson et al. |
| 6,681,238 B1 | 1/2004 | Brice, Jr. et al. |
| 6,862,735 B1 | 3/2005 | Slaughter et al. |
| 7,158,972 B2 | 1/2007 | Marsland |
| 7,191,440 B2 | 3/2007 | Cota-Robles et al. |
| 7,203,944 B1 | 4/2007 | Van Rietschote et al. |
| 7,213,246 B1 | 5/2007 | Van Rietschote et al. |
| 7,596,654 B1 | 9/2009 | Wong |
| 8,544,004 B2 | 9/2013 | Fultheim et al. |
| 2002/0052914 A1 | 5/2002 | Zalewski et al. |
| 2003/0005068 A1 | 1/2003 | Nickel et al. |
| 2003/0037089 A1 | 2/2003 | Cota-Robles et al. |
| 2003/0061254 A1 | 3/2003 | Lindwer et al. |
| 2004/0054517 A1 | 3/2004 | Altman et al. |
| 2005/0039180 A1 | 2/2005 | Fultheim et al. |
| 2005/0044301 A1 | 2/2005 | Vasilevsky et al. |

OTHER PUBLICATIONS

Radovic et al., "DSZoom—Low Latency Software-Based Shared Memory", Royal Institute of Technology and Uppsala University, Parallel and Scientific Computing Institute, Report No. 2001:03, Apr. 2001.

Munro, J., "Virtual Machines and VMWare, part 1", ExtremeTech, Wireless Messaging, Dec. 21, 2001.

Noordergraaf et al., "Performance Experiences on Sun's Wildfire Prototype", ACM/IEEE Conference on Supercomputing, Nov. 13-18, 1999.

Laudon et al., "The SGI Origin: A ccNUMA Highly Scalable Server", Proceedings of the 24th Annual International Symposium on Computer Architecture, pp. 241-251, Jun. 2-4, 1997.

Govil et al., "Cellular Disco: Resource Management using Virtual Clusters on Shared-Memory Multiprocessors", ACM Transactions on Computer Systems, vol. 18, No. 3, pp. 229-262, Aug. 2000.

U.S. Appl. No. 10/828,465 Official Action dated Aug. 6, 2007.

U.S. Appl. No. 10/828,465 Official Action dated Jan. 28, 2008.

Bugnion et al., "Disco: Running Commodity Operating Systems on Scalable Multiprocessors", Proceedings of 16th Symposium on Operating Systems Principles, Saint-Malo, France, Oct. 1997.

Bugnion et al., "Disco: Running Commodity Operating Systems on Scalable Multiprocessors", ACM Transactions on Computer Systems, vol. 15, No. 4, pp. 412-447, Nov. 1997.

Govil et al., "Cellular Disco: Resource Management using Virtual Clusters on Shared-Memory Multiprocessors", 17th ACM Symposium on Operating Systems Principles, Operating Systems Review, vol. 34, No. 5, pp. 154-169, Dec. 1999.

U.S. Appl. No. 10/828,465 Official Action dated Jun. 5, 2008.

U.S. Appl. No. 10/828,465 Official Action dated Nov. 26, 2008.

U.S. Appl. No. 10/828,465 Official Action dated May 18, 2009.

U.S. Appl. No. 10/828,465 Official Action dated Dec. 30, 2009.

Isidehpc.com, "Q&A with HPC Virtualization software maker ScaleMP", May 29, 2009 (insidehpc.com/2009/05/29/qa-with-hpc-virtualization-software-maker-scalemp/).

U.S. Appl. No. 10/828,465 Official Action dated Jul. 16, 2010.

U.S. Appl. No. 10/828,465 Examiner's Answer on Appeal dated May 20, 2011.

VMWARE Inc. "WMWARE Workstation: User's Manual", version 3.2, year 2002.

U.S. Appl. No. 10/828,465 Advisory Action dated Feb. 25, 2009.

U.S. Appl. No. 13/290,087 Official Action dated Feb. 21, 2012.

* cited by examiner

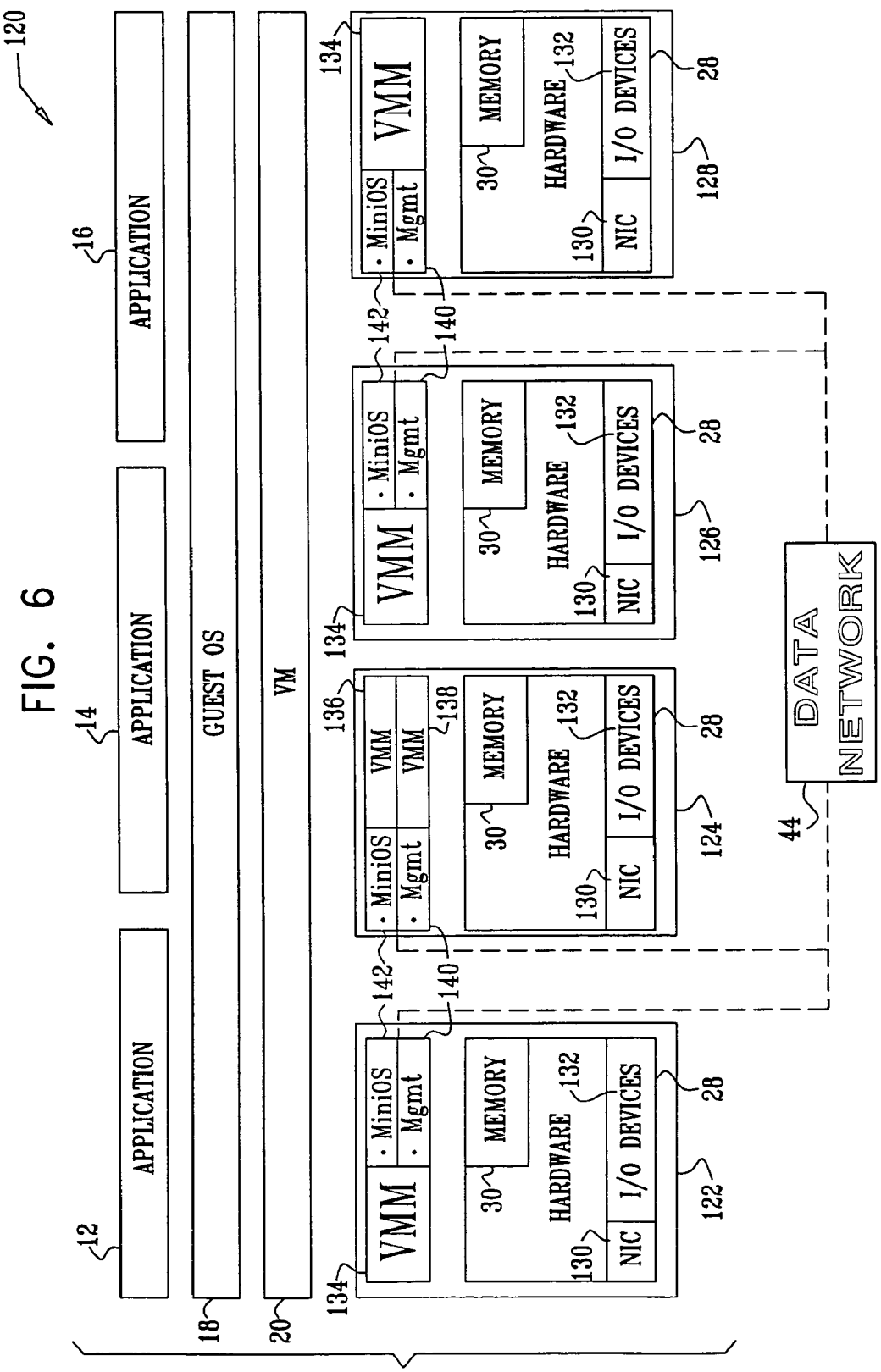

CLUSTER-BASED OPERATING SYSTEM-AGNOSTIC VIRTUAL COMPUTING SYSTEM

CROSS-REFERENCE TO RELATED APPLICATIONS

This application is a continuation of U.S. patent application Ser. No. 10/828,465, filed Apr. 21, 2004, which claims the benefit of Provisional Application No. 60/494,392, filed Aug. 11, 2003, and of Provisional Application No. 60/499,646, filed Sep. 2, 2003.

REFERENCE TO COMPUTER PROGRAM LISTING APPENDIX

A computer program listing appendix is submitted herewith on one compact disc and one duplicate compact disc. The total number of compact discs including duplicates is two. The files on the compact disc are software object code and accompanying files for carrying out the invention. Their names, dates of creation, directory locations, and sizes in bytes are:

.CONFIG of Aug. 27, 2003 located in the root folder and of length 28,335 bytes;

BIOS.HEX of Aug. 27, 2003 located in the root folder and of length 241,664 bytes;

SCMPVMMO.HEX of Aug. 27, 2003 located in the root folder and of length 201,603 bytes;

SCMPVMMS.HEX of Aug. 27, 2003 located in the root folder and of length 20,119 bytes; and USERMODE.HEX of Aug. 27, 2003 located in the root folder and of length 37,170 bytes.

The material on the compact discs is incorporated by reference herein.

Installation and execution instructions for the material on the compact disks are provided hereinbelow at Appendix 1.

BACKGROUND OF THE INVENTION

1. Field of the Invention

This invention relates to virtual computers. More particularly, this invention relates to improvements in a cluster-based symmetric multiprocessor.

2. Description of the Related Art

The meanings of certain acronyms and terminology used herein are given in Table 1.

TABLE 1

| | |
|---|---|
| API | Application programming interface |
| CPU | Central processing unit |
| DMA | Direct Memory Access - used by hardware devices, which are required to copy data to and from main system memory. DMA is used to relieve the CPU from waiting during memory accesses. |
| False sharing | In shared memory multiprocessors, when processors make references to different data items within the same block even though there is no actual dependence between the references. |
| FSB | Front-side bus |
| NIC | Network interface card |
| NUMA | Non-uniform memory access |
| PCI | Peripheral Component Interconnect - a standard for peripheral software and hardware interfaces. |
| SMP | Symmetric multiprocessor |
| TLB | Translation lookaside buffer |
| VM | Virtual machine |
| VMM | Virtual machine monitor |

A portion of the disclosure of this patent document, which includes a CD-ROM appendix, contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The use of virtual computers (generally referred to as "virtual machines") to enhance computing power has been known for several decades. For example, a classic system, VM, produced by IBM, enabled multiple users to concurrently use a single computer by running multiple copies of the operating system. Virtual computers have been realized on many different types of computer hardware platforms, including both single-processor and multi-processor units.

Some virtual machine monitors are able to provide concurrent support for diverse operating systems. This requires the virtual machine monitor to present a virtual machine, that is a coherent view of the hardware, to each operating system. The above-noted VM system has evolved to the point where it is asserted that in one version, z/VM®, available from IBM, New Orchard Road, Armonk, N.Y., multiple operating systems can execute on a single server.

Despite these achievements in virtual computing, practical issues remain. The currently dominant personal computer architecture, X86/IA32, which is used in the Intel Pentium™ and other Intel microprocessors, is not conducive to virtualization techniques for two reasons: (1) the instruction set of the CPU is not natively virtualizable; and (2) the X86/IA32 architecture has an open I/O architecture, which complicates the sharing of devices among different operating systems. This has been an impediment to continued advancements in the field. In general, it is inefficient, and probably impractical, for multiple operating systems to concurrently share common X86/IA32 hardware directly. System features of the X86/IA32 CPU are designed to be configured and used in a coordinated effort by only one operating system, e.g., paging and protection mechanisms, and segmentation.

Limitations of the X86/IA32 architecture can be appreciated by a brief explanation of one known approach to virtual computers, in which a virtual machine monitor is used to provide a uniform execution environment within a computer. A virtual machine monitor is a software layer that in this approach is interposed between hardware of a single computer and one or more guest operating systems that support different applications. In this arrangement the virtual machine monitor interacts directly with the hardware, and exposes an expected interface to the guest operating systems. This interface includes normal hardware facilities, e.g., CPU, I/O, and memory.

When virtualization is properly done, the guest operating systems are unaware that they are interacting with a virtual machine instead of directly with the hardware. For example, low level disk operations invoked by the operating systems, interaction with system timers, interrupts and exception handling are all managed transparently by the guest operating systems via the virtual machine monitor. To accomplish this, it is necessary that the virtual machine monitor be able to trap and execute certain hardware instructions dealing with the state of the processor.

Significantly, the X86/IA32 employs four modes of protected operation, which are conveniently conceptualized as rings of protection, known as protection rings 0-3. Protection ring 0 is the most protected, and was designed for execution of the operating system kernel. Privileged instructions available only under protection ring 0 include instructions dealing with interrupt handling, and the modification of processor flags and page tables. Typical examples are store instructions for the global descriptor table (SGDT) and interrupt descriptor table (SIDT). Protection rings 1 and 2 were designed for other operating system services, e.g., device drivers. Protection ring 3, the least privileged, was intended for applications, and is also referred to as user mode. If it were possible to trap all of the privileged X86/IA32 instructions in user mode, it would be relatively straightforward for the virtual machine monitor to handle them using ordinary exception-handling techniques. Unfortunately, there are many privileged instructions of the X86/IA32 instruction set, which cannot be trapped under protection ring 3. Attempts to naively execute privileged instructions under protection ring 3 typically result in a general protection fault.

Because of the importance of the X86/IA32 architecture, considerable effort has been devoted to overcoming its limitations with regard to virtualization. Virtual machines have been proposed to be implemented by software emulation of at least the privileged instructions of the X86/IA32 instruction set. Alternatively, binary translation techniques can be utilized in the emulator. Binary translation techniques in connection with a virtual machine monitor are disclosed in U.S. Pat. No. 6,397,242, the disclosure of which is incorporated herein by reference. Additionally or alternatively, combinations of direct execution and binary translation can be implemented. The open source Bochs IA-32 Emulator, downloadable via the Internet, is an example of a complete emulator. Another example is the SimOS environment, available via the Internet. The SimOS environment is adapted to the MIPS R4000 and R10000 and Digital Alpha processor families. Generally, the performance of emulators is relatively slow.

Another known approach employs a hosted architecture. A virtual machine application uses a VM driver to load a virtual machine monitor at a privileged level. Typical of this approach are the disclosures of U.S. Pat. Nos. 6,075,938 and 6,496,847, which are incorporated herein by reference. The virtual machine monitor then uses the I/O services of a host operating system to accommodate user-level VM applications. Current examples of this approach include the VMware Workstation™, the VMware GSX Server™, both available from VMware, Inc., 3145 Porter Drive, Palo Alto, Calif. 94304, and the Connectix Virtual PC™, available from Microsoft Corporation, One Microsoft Way, Redmond, Wash. 98052-6399. Another example is the open source Plex86 Virtual Machine, available via the Internet. The hosted architecture is attractive due to its simplicity. However, it incurs a performance penalty because the virtual machine monitor must itself run as a scheduled application under the host operating system, and could even be swapped out. Furthermore, it requires emulators to be written and maintained for diverse I/O devices that are invoked by the virtual machine monitor.

It is known in the art to use multiple processors in a single computer in order to enhance overall system performance. One known architecture is symmetric multiprocessing (SMP), in which application programs are processed by multiple processors that share a common operating system and memory. Typically, the processors share memory and the I/O bus or data path, and are controlled by a single instance of an operating system. In order to enhance performance, SMP systems may employ non-uniform memory access (NUMA), a method of configuring the microprocessors so that they can share memory locally.

In a variation of multiprocessing systems, multiple relatively small computers, either uniprocessors or multiprocessors having relatively few processors, are linked together and coordinated to execute multiple applications, while serving one or more users. This arrangement is known as a cluster, or scaled-out arrangement. Some systems of this type can outperform corresponding SMP configurations. However, in the past it has been necessary that applications for cluster-based systems be specialized, so that they are cluster-aware. This has increased development expense, and in some cases, has impeded the use of standard commercial software on cluster-based systems.

An unsuccessful attempt to implement a VM computing paradigm on cluster-based systems is disclosed in the document *The Memory and Communication Subsystem of Virtual Machines for Cluster Computing, Shiliang Hu and Xidong Wang, January* 2002 (Hu et al.), published on the Internet. In this proposed arrangement, multiple SMP clusters of NUMA-like processors are monitored by virtual machine monitors. A cluster interconnect deals with message passing among the clusters. The system consists of multiple virtual machines that operate under a single operating system, and support parallel programming models. While a virtual computer built according to this paradigm would initially appear to be highly scalable, preliminary simulations of the communication and memory subsystems were discouraging. A further difficulty is posed by limitations of current operating systems, which are generally unaware of the locality of NUMA-type memory. According to Hu et al., the proposed paradigm could not be reduced to practice until substantial technological changes occur in the industry. Thus Hu et al. appears to have encountered a well-known difficulty: cluster machines generally, and NUMA machines in particular, can be scaled up successfully only if some way is found to ensure a high computation to communication ratio in regard to both data distribution and explicit communication among the clusters and processors.

The most successful of the solutions noted above, in the case of the IBM z/VM product, have relied upon revisions and optimizations of the underlying computer hardware in order to overcome the issues encountered by Hu et al., and to increase performance generally, or have required kernel modifications of operating system software, in the case of the above-noted VMWare products. These approaches are costly in terms of product development, marketing, and maintenance, and often commercially impracticable, due to secrecy policies of operating system software vendors.

SUMMARY OF THE INVENTION

According to a disclosed embodiment of the invention, an improved cluster-based collection of computers (nodes) is realized using unmodified conventional computer hardware and unmodified operating system software. Software is provided that enable a virtual machine to be presented to a guest operating system, wherein each node participating with the virtual machine has its own emulator or virtual machine monitor. VM memory coherency and I/O coherency are provided by hooks, which result in the manipulation of internal processor structures. A private network provides communication among the nodes.

The invention provides a method for executing a software application in a plurality of computing nodes has node resources, wherein the nodes include a first node and a second node that intercommunicate over a network, and the nodes is operative to execute a virtual machine that runs under a guest operating system. The method is carried out by running at least a first virtual machine implementer and a second virtual machine implementer on the first node and the second node, respectively, and sharing the virtual machine between the first virtual machine implementer and the second virtual machine implementer.

An aspect of the method includes running the software application over the guest operating system, so that commands invoked by the software application are monitored or emulated by the first virtual machine implementer and by the second virtual machine implementer on the first node and the second node, while the node resources of the first node and the second node are shared by communication over the network.

According to an additional aspect of the method, at least one of the first virtual machine implementer and the second virtual machine implementer is a virtual machine monitor.

According to one aspect of the method, at least one of the first virtual machine implementer and the second virtual machine implementer is an emulator.

According to still another aspect of the method, at least the first node has a first virtual node that includes a first physical CPU of the first node and has a second virtual node that includes a second physical CPU of the first node.

According to another aspect of the method, there are a plurality of virtual machines including a first virtual machine and a second virtual machine, wherein the first virtual machine and the second virtual machine have a plurality of virtual CPU's that are virtualized by the first virtual machine implementer in the first node based on a first physical CPU and by the second virtual machine implementer in the second node based on a second physical CPU, respectively.

According to yet another aspect of the method, and a first virtual node includes the first physical CPU and the second physical CPU.

According to a further aspect of the method, the first virtual machine implementer virtualizes at least one of the virtual CPU's of the first virtual machine based on the first physical CPU and virtualizes at least one of the virtual CPU's in the second virtual machine based on the second physical CPU.

Another aspect of the method includes providing a management system for the first virtual machine implementer and the second virtual machine implementer to control the first node and the second node, respectively, wherein the management system includes a wrapper for receiving calls to a device driver from the first virtual machine implementer, the wrapper invoking the device driver according to a requirement of the first virtual machine implementer.

A further aspect of the method includes providing a virtual PCI controller for the management system to control a physical PCI controller in one of the nodes.

Yet another aspect of the method includes providing a virtual DMA controller for the management system to control a physical DMA controller in one of the nodes.

Still another aspect of the method includes providing a virtual PCI controller to control a physical PCI controller in one of the nodes, and during a bootup phase of operation scanning a device list with the virtual PCI controller to remap memory regions and resources and identify devices having on-board DMA controllers.

In one aspect of the method the virtual machine implementer maintains mirrors of a memory used by the guest operating system in each of the nodes, the method further including write-invalidating at least a portion of a page of the memory in one of the nodes, and transferring a valid copy of the portion of the page to the one node from another of the nodes via the network.

The invention provides a computer software product, including a computer-readable medium in which computer program instructions are stored, which instructions, when read by a computer, cause the computer to perform a method for executing a software application in a plurality of computing nodes has node resources, wherein the nodes include a first node and a second node that intercommunicate over a network, and the nodes is operative to execute a virtual machine that runs under a guest operating system. The method is carried out by running at least a first virtual machine implementer and a second virtual machine implementer on the first node and the second node, respectively, and sharing the virtual machine between the first virtual machine implementer and the second virtual machine implementer.

The invention provides a computer system for executing a software application, including a plurality of computing nodes, the plurality of computing nodes including at least a first node and a second node, a network connected to the first node and the second node providing intercommunication therebetween, a first virtual machine implementer and a second virtual machine implementer executing on the first node and the second node, respectively. The system further includes a virtual machine implemented concurrently by at least the first virtual machine implementer and the second virtual machine implementer, and a guest operating system executing over the virtual machine, wherein the software application executes over the guest operating system, so that commands invoked by the software application are received by the first virtual machine implementer and the second virtual machine implementer on the first node and the second node, while the node resources of the first node and the second node are shared by communication over the network.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 6 is a block diagram of a cluster-based virtual computing arrangement that employs a virtual machine monitor having a management system, that is constructed and operative in accordance with an alternate embodiment of the invention.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

Introductory Comments.

A virtual node is the combination of a dedicated memory segment, a dedicated device group (which can contain no devices), and at least one CPU. A virtual machine implementer, such as a virtual machine monitor or machine emulator or simulator, disguises the virtual machine, so that an operating system that issues calls to the virtual machine can use only the virtual node resources.

A virtual CPU is an object that appears to be a CPU from the perspective of a virtual machine. The operating system is unaware that it is controlling a virtual CPU rather than a physical CPU. The virtual machine implementer can replace the CPU context with several virtual CPU contexts, hence virtualizing more than one CPU based on one physical CPU.

Embodiment 1

Figure 1:
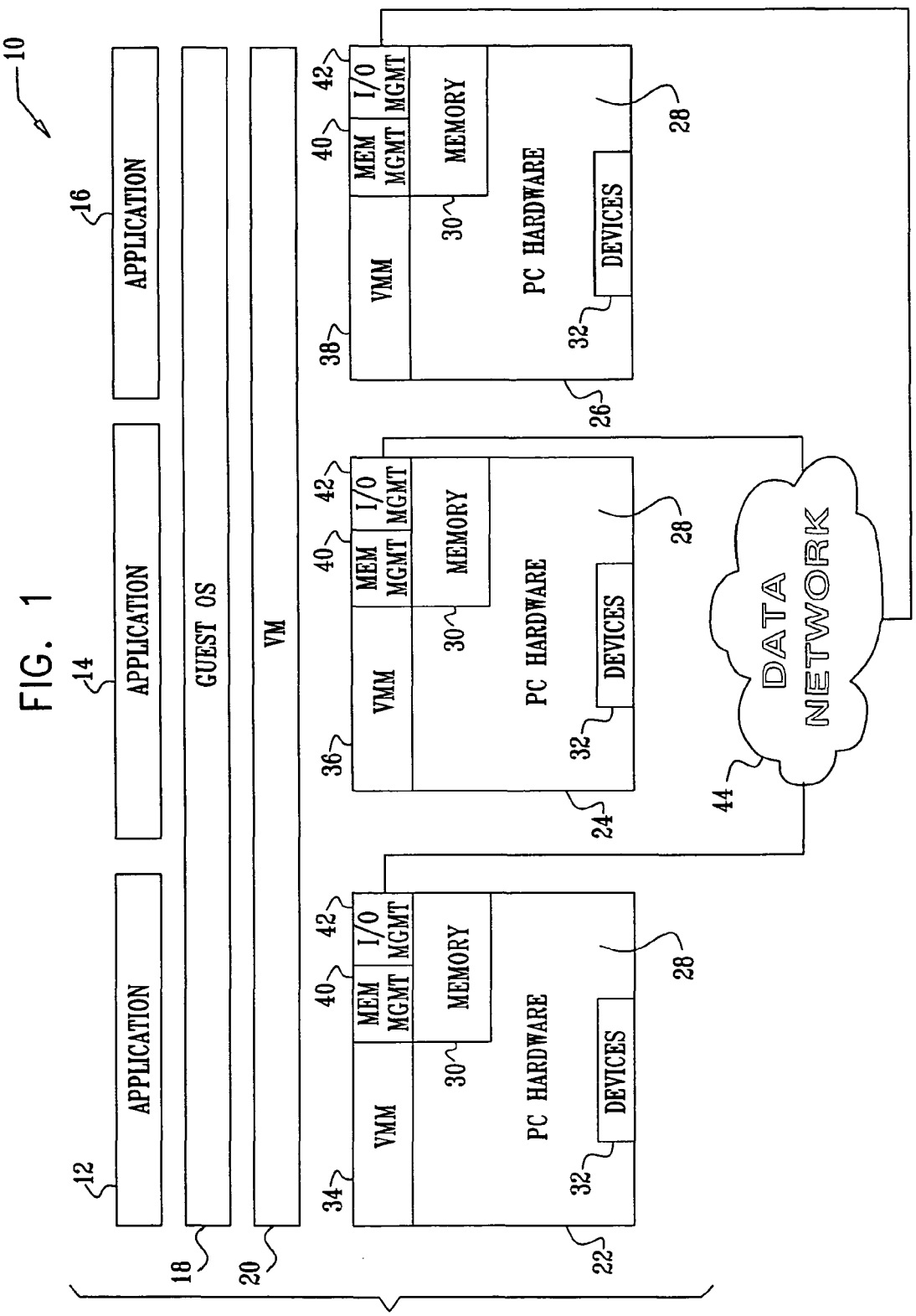
FIG. 1 is a block diagram of a cluster-based virtual computing arrangement that is constructed and operative in accordance with a disclosed embodiment of the invention.

Turning now to the drawings, reference is initially made to FIG. 1, which is a block diagram of a cluster-based virtual computing system 10 that is constructed and operative in accordance with a disclosed embodiment of the invention. A plurality of user applications 12, 14, 16 execute simultaneously, supported by a guest operating system 18, which can be any conventional unmodified operating system supported by the instruction set architecture (ISA) of a plurality of nodes 22, 24, 26, e.g., Microsoft Windows®, Unix®, Linux®, or Solaris X86 in the case of the X86/IA32 ISA. The guest operating system 18 controls a virtual machine 20, which presents itself to the guest operating system 18 as though it were a conventional real machine. While the system 10 is disclosed with reference to the X86/IA32 family of processors, the invention is not limited to the X86/IA32 family of processors, but is applicable to other computer architectures.

While three nodes are shown, the system 10 is scalable, and any number of nodes may be present, depending on the needs of a particular application and the performance desired. The nodes 22, 24, 26 each comprise computer hardware 28, which in a current embodiment use the X86/IA32 ISA. Instructions of the guest operating system 18 are distributed for execution among the nodes 22, 24, 26 as though the system 10 were a single SMP machine with NUMA-like shared memory. This "virtual SMP" operation is transparent to the guest operating system 18 and to the applications 12, 14, 16, which consequently benefit from enhanced computing speed without having to be "cluster-aware."

The hardware 28 includes nodal memory 30 and may also be provided with many other types of conventional personal computer devices 32, for example, I/O devices and NIC's or other network communications facilities. Different versions of the X86/IA32 ISA compatible processor may be placed in different nodes, and various other aspects of the computer hardware may vary in different nodes. For example, the processor speed, bus speed, memory configuration, and I/O facilities may vary among the different nodes. It is only necessary that the different nodes all support a common ISA. Even this limitation can removed by using a full machine emulator to emulate an ISA that differs from the ISA of the system on which it is running.

The system 10 is not dependent on any particular virtual machine implementation technique in any particular node. This point is emphasized in the exemplary configuration shown in FIG. 1, in which the nodes 22, 24 are provided with virtual machine monitors 34, 36, which can differ in implementation technique or hardware. For example, the virtual machine monitors 34, 36 could be different products, such as the above noted plex86, Xen (available via the Internet), VMWare workstation, Microsoft virtual server, or any other similar product. The node 26 does not have a virtual machine monitor. Instead, it is virtualized by an emulator 38, which can be the Bochs IA-32 Emulator.

One of the main functions of a virtual computer is virtualized execution of the kernel code. Virtualized execution means that the guest operating system 18 receives effectively the same results from having its code executed on a virtual computer as on a real computer. Code of the guest operating system 18 is ultimately executed via the virtual machine 20 on the CPU's of the hardware 28. Therefore, a core element in the functionality of a virtual computer is the virtualization of the CPU instructions, the execution of which would otherwise break the virtualization and cause inconsistent operation or even total breakdown of the guest operating system. To this end, virtualized kernel code execution is performed in the virtual machine monitors 34, 36, and emulated in the emulator 38. The virtual machine monitors 34, 36 catch faults, exceptions and interrupts generated in the hardware 28, whether arising in the CPU or in other components of the hardware 28. The main task of the virtual machine monitors 34, 36 is to handle the faults, exceptions and interrupts in a manner that leads the guest operating system 18 to perceive that its own execution is as expected. Thus, the virtual machine can be implemented using any combination of the above-noted known techniques, e.g., virtual machine monitor, emulation with or without binary translation, or combinations thereof, or variants of a hosted architecture. The system 10 can be constructed using different types of emulators and different types of virtual machine monitors in many combinations.

Memory coherence among the nodes 22, 24, 26 is achieved by a memory management module 40, which maintains copies of all memory content on each instance of the memory 30, and maintains a record of page or sub-page validations and invalidations. Similarly, a single coherent I/O view is achieved by an I/O management module 42. The details of the memory management module 40 and the I/O management module 42 are disclosed in further detail hereinbelow.

A private network 44 provides rapid internodal communication, which is necessary for diverse functions of the virtual machine monitors 34, 36 and the emulator 38, including operation of the memory management module 40, the I/O management module 42, and processing of hardware and software interrupts between the nodes 22, 24, 26. The private network 44 may be realized using standard networking equipment. High bandwidth, low-latency network elements are used to boost performance. Standard host operating system NIC drivers, for example Linux NIC drivers, can be used to operate NIC's for the private network 44 as one of the devices 32 in each of the nodes 22, 24, 26. Other NIC's may also be included among the devices 32 for guest operating system outbound network communications beyond the cluster of the system 10.

Virtual Machine Monitor.

Figure 2:
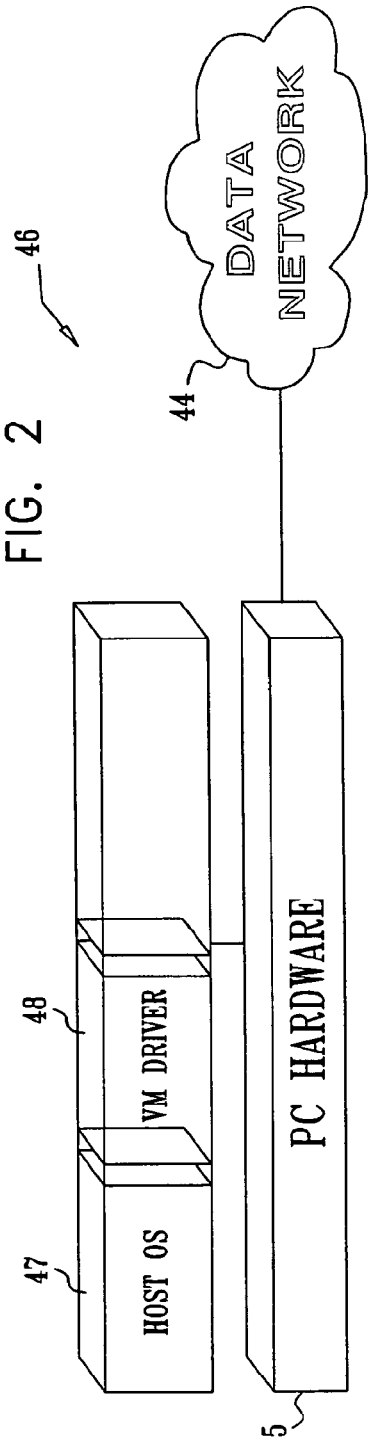
FIG. 2 is a detailed block diagram of a virtual machine monitor that is constructed and operative in accordance with an alternate embodiment of the invention.

As shown in FIG. 1, the virtual machine monitor 34 runs on bare hardware. It is capable of supporting one or more virtual machines, but has the disadvantage that I/O devices must be supported by this type of virtual machine monitor. Reference is now made to FIG. 2, which is a detailed block diagram of an alternate virtual machine monitor 46 that is constructed and operative in accordance with a disclosed embodiment of the invention, and which is suitable for use as the virtual machine monitor 34 in the system 10 (FIG. 1), and in the other embodiments of a virtual computing system disclosed herein. The virtual machine monitor 46 either integrally includes, or can access a VM driver 48 that loads the virtual machine monitor 46 into kernel memory, so that it can run at a privileged level. The virtual machine monitor 46 employs the services of an unmodified full host operating system 47 to control the hardware 5. This method of operation is similar to the approach of the above-noted U.S. Pat. No. 6,496,847, in which a user-level emulator accepts commands from a virtual machine monitor via a specialized system-level driver and processes these commands as remote procedure calls. The emulator is able to issue host operating system calls and thereby access the physical system devices via the host operating system. The host operating system itself thus handles execution of certain virtual machine instructions, such as accessing physical devices. However, the technique of U.S. Pat. No. 6,496,847 is only disclosed with respect to a single hardware node. The system 10 (FIG. 1) also differs from the disclosure of the above-noted U.S. Pat. No. 6,075,938, in which the virtual machine monitor is only shown to run on bare hardware, and to control a single multiprocessing computer. Furthermore, the system disclosed in U.S. Pat. No. 6,075,938 requires kernel modifications of the host operating system to operate successfully. An implementation of the virtual machine monitor 46 is found in the computer program listing appendix.

Figure 3:
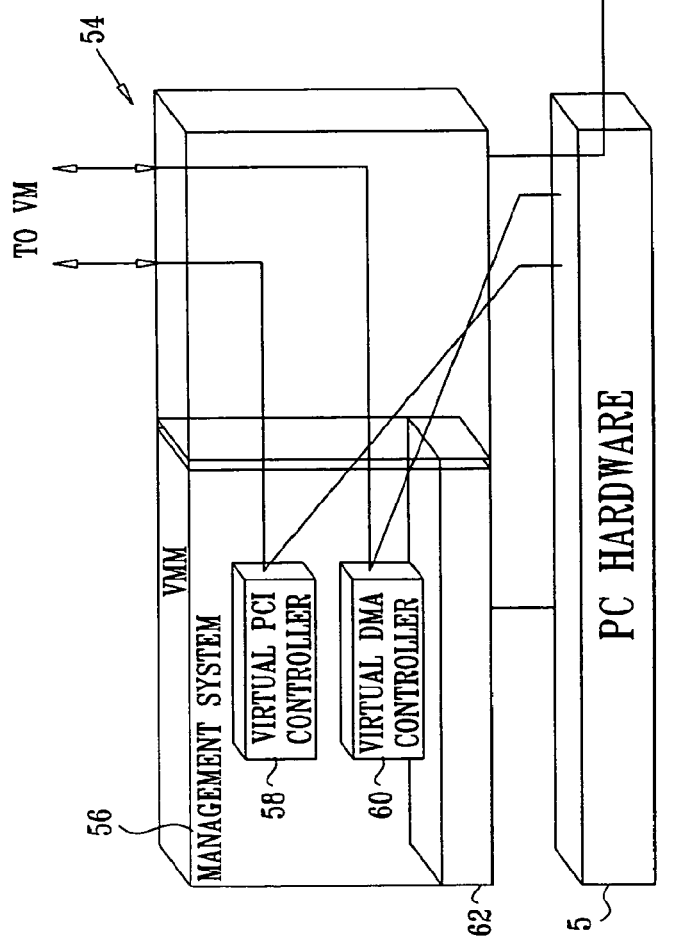
FIG. 3 is a detailed block diagram of an alternate virtual machine monitor that is constructed and operative in accordance with an alternate embodiment of the invention.

Reference is now made to FIG. 3, which is a detailed block diagram of an alternate virtual machine monitor 54 that is constructed and operative in accordance with a disclosed embodiment of the invention. The virtual machine monitor 54 can be used in any of the embodiments of a virtual computing system disclosed herein. The virtual machine monitor 54 does not rely upon the host operating system, but instead includes a management system 56, which is mainly used during boot-up and for coordinating private network communications during normal operation.

The management system 56 maintains a virtual PCI controller 58, which serves as a proxy between the guest operating system and the physical PCI controllers. During boot-up, the virtual PCI controller 58 collects hardware information from the underlying hardware 5. Exploiting flexibilities of the PCI specification, it rearranges the PCI devices in the local node and throughout the cluster, using virtual PCI-to-PCI bridges. The virtual PCI controller 58 also ascertains that there are no conflicts in the I/O ports and memory regions used by the physical PCI devices on the individual hardware 5 or elsewhere in the cluster. Thus, the virtual PCI controller 58 makes the separate PCI buses of the individual nodes 22, 24, 26 (FIG. 1) appear to the guest operation system 18 as a single PCI address space, i.e., a single bridged virtual PCI bus. Currently prevalent commodity operating systems do not support multiple PCI buses. Nevertheless, in some embodiments, the virtual PCI controller 58 may have the capability of implementing multiple virtual PCI buses in anticipation that they may be supported by future commodity operating systems.

Subsequently, the virtual PCI controller 58 serves as a sniffer for PCI configuration actions taken by the guest operating system, and tracks any changes made by the guest operating system to the PCI devices' I/O ports and memory regions. It respects such changes and forwards them to the PCI host of the appropriate physical node. It is also responsible for updating internal tables regarding I/O port and memory region assignments within the cluster.

The virtual PCI controller 58 emulates hot-pluggable PCI events for the guest operating system. This allows for dynamic node addition and removal. If and when the physical hardware generates hot-pluggable PCI events, it is the responsibility of the virtual machine monitor 54 to forward these events to the guest operating system.

The management system 56 includes a virtual DMA controller 60, which is a virtual layer that is capable of forwarding remote DMA requests between the guest operating system and remote nodes. The virtual DMA controller 60 is implemented by catching (intercepting) exceptions relating to reserved I/O ports assigned to a corresponding physical DMA Controller, which may be a third party device. It is possible to differentiate DMA operations that can be performed entirely locally from those in which either or both the device or the memory area are remote. DMA operations, which are entirely local, are forwarded as quickly as possible to a physical DMA controller of the local hardware 5, and are performed with almost no delay. DMA operations that involve memory and a device that does not reside on the same node are handled by transferring remote pages to the node where the device resides via the private network 44, and executing the DMA operation on that node.

In a normal PCI environment, multiple DMA controllers exist concurrently; possibly different DMA controllers may exist on different add-on cards, i.e., "first party" DMA controllers. Therefore, there needs to be a general solution to deal with the multitude of controllers. Each card may have its own rules and semantics for communicating with its respective DMA controller. However, there are a few commonly-used methods, each having its own semantics. The virtual DMA controller 60 (FIG. 3) may provide a high-level language for defining in a unified manner, which I/O Ports, memory addresses, and sequences are required to be intercepted by the virtual machine monitor 54. Such values are monitored and recorded by the virtual machine monitor 54 during normal operation.

When a DMA operation involving a first party DMA controller is initiated, usually by writing a certain value to a DMA controller port or memory register, the DMA operation is performed and the memory is marked by the virtual DMA controller 60 as invalid or locked on all other machines except the machine on which the DMA controller resides. Once notification of a successful DMA operation from a card is detected in a virtual machine monitor, either by an interrupt or by polling the appropriate I/O ports or memory ranges, that memory is again marked as unlocked, and available for access by remote machines. An alternate optimization method may be offered to allow incoming DMA operations, i.e., device to memory, to instantiate the operation in predefined reserve memory and copy the reserve memory to the guest operating system memory area once the operation is completed. This will prevent locking the memory accessed by the DMA operation for a long time.

Bootup.

When power is initially applied to a PCI device, the hardware remains inactive. In other words, the device only responds to configuration transactions. At power-on, the device has no memory and no I/O ports mapped in the computer's address space; every other device-specific feature, such as interrupt reporting, is disabled as well. Fortunately, every PCI motherboard is equipped with PCI-aware firmware: the BIOS. The firmware offers access to the device configuration address space by reading and writing registers in the PCI controller.

At system boot, the firmware or the OS, for example the Linux kernel, performs configuration transactions with every PCI peripheral in order to allocate a safe place for any address region it offers. By the time a device driver accesses the device, its memory and I/O regions have already been mapped into the processor's address space. While a device driver can change this default assignment, in practice this is not done.

The virtual PCI controller 58 takes control at this stage, reading all of the device configuration data, storing it in one node, e.g., a master node, and performs a remapping of all regions and resources. After this remapping is completed, it is delegated to the actual physical PCI controllers. The virtual PCI controller 58 scans the device list, and deals specially with certain device ID's that are known to have on-board DMA controllers, e.g., IDE cards, NIC's, and SCSI Controllers. Such DMA controllers are virtualized by the virtual DMA controller 60 so that DMA operations on these cards can take place.

Eventually, the management system 56 requests configuration data for all devices, which is supplied by the virtual PCI controller 58.

During normal operation the virtual PCI controller 58 continually tracks hardware configuration changes, including requests by the guest operating system to map or remap hardware regions. A table, mapping regions to actual node ID's, is maintained and updated.

Memory Coherence.

Each virtual machine presents a single coherent shared memory to the guest operating system, while physical memory 30 may be distributed across multiple nodes. To support this functionality transparently to the guest operating system, several techniques are used in different combinations, as may required to optimize the performance and reliability of a particular cluster-based system.

Referring again to FIG. 1 and FIG. 3, in one embodiment memory mirroring is used across all the nodes 22, 24, (FIG. 1). Memory mirroring provides protection for memory analogous to the protection afforded hard disk drives by RAID-1 disk mirroring. Reliability may be enhanced by using Chipkill™ memory, available from IBM, New Orchard Road, Armonk, N.Y., which allows multiple errors to be corrected. Another technique that can be employed to enhance reliability is elliptical curve cryptography (ECC) of data.

Page or sub-page validations and write-invalidations are performed by the virtual machine monitor 34, and communicated to the other nodes using the private network 44. When an invalid page is required by a particular node, memory migration is performed, originating from a node having a valid copy of that page. As CPU's provide page-based memory access protection, implementation of page level granularity is sufficient in most cases. That is to say, page-size internodal memory transfers are performed. In some cases, where only a portion of a page is frequently invalidated, sub-page granularity can be achieved adaptively using the same page level granularity mechanism with additional software. This prevents false sharing and has the additional benefit of reducing internodal traffic on the private network 44.

Further aspects of the coherent memory system used in embodiments of the present invention are described below in the subsection entitled "Memory Management Subsystem."

Embodiment 2

Figure 4:
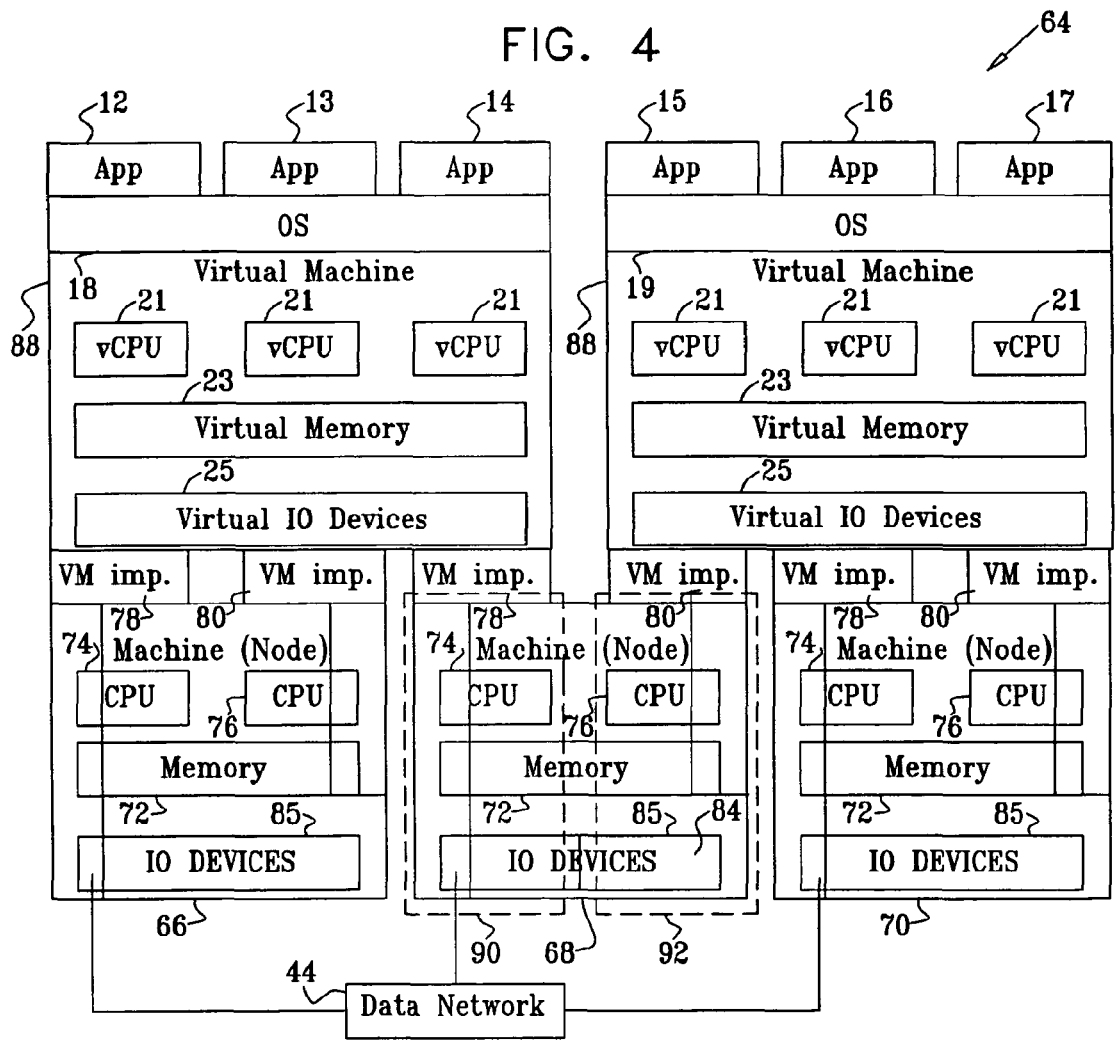
FIG. 4 is a block diagram of a cluster-based virtual computing arrangement employing multiprocessors and virtual nodes in which there are a plurality of virtual machine implementers per node that is constructed and operative in accordance with an alternate embodiment of the invention.

Reference is now made to FIG. 4, which is a block diagram of a cluster-based virtual computing system 64 that is constructed and operative in accordance with an alternate embodiment of the invention. In this embodiment there are a plurality of nodes 66, 68, 70 that are realized as multiprocessor computer hardware, including memory 72, I/O devices 85 and at least two CPUs 74, 76 per node. In one configuration of the system 64, each CPU in a node is included in a different virtual node, and is controlled by a different virtual machine. One virtual machine implementer is thus capable of using one physical CPU to virtualize a plurality of virtual CPU's.

The system 64 employs two guest operating systems 18, 19 to concurrently execute multiple applications 12 13, 14, 15, 16, 17. Applications 12, 13, 14 are supported by the guest operating system 18. Applications 15, 16, 17 are supported by the guest operating system 19.

The guest operating systems 18, 19 control virtual machines 86, 88, respectively. Each virtual machine has a plurality of virtual CPU's 21. Three virtual CPU's are shown; however, larger numbers of CPU's can be virtualized. Furthermore, none of the nodes 66, 68, 70, the virtual nodes 90, 92 or the virtual machines 86, 88 needs to be configured identically. In fact, the virtual machines 86, 88 can have different numbers of virtual CPU's. The virtual machines 86, 88 are provided with virtual memory 23, and virtual I/O devices 25.

Two virtual machine implementers 78, 80 are included with each of the nodes 66, 68, 70 to implement the virtual machines 86, 88. The virtual machine implementers 78, 80 can be virtual machine monitors or emulators in any combination. The number of virtual machine implementers is only partially related to the number of CPU's in a node. The number of virtual machine implementers more closely relates to the implementation method itself. For example, multiple emulators can run over one CPU. Alternatively, each emulator can provide multiple virtual CPU's, as is disclosed below (Embodiment 3).

A unit comprising the CPU 76, and a dedicated segment of the memory 72 makes use of only part of the computing resource of the hardware, such a device group, and is known as a virtual node. A virtual node may make use of one CPU of a multiprocessor, or more. The node 68, for example, has two virtual nodes 90, 92, which are enclosed by broken lines. The system 64 is flexible in its ability to deal with I/O devices that are physically distributed among the nodes 66, 68, 70 transparently to the guest operating systems 18, 19. To support this functionality, in the node 68 the virtual machine implementer 78 is associated with the virtual node 90, and the virtual machine implementer 80 with the virtual node 92. The I/O devices 85 in the node 68 may be arbitrarily segmented into device groups 82, 84, which are accessible to the virtual machines 86, 88, (in addition to the I/O devices in the nodes 66, 70). The I/O devices 85 in the node 68 are also accessible by the nodes 66, 70, using the private network 44. The device groups 82, 84 are controlled respectively by the virtual machine implementers 78, 80. In the node 68, the CPU 74 is controlled by the virtual machine implementer 78, the virtual machine 86, and the guest operating system 18. The CPU 76 is controlled by the virtual machine implementer 80, the virtual machine 88, and the guest operating system 19. Thus, two operating systems simultaneously control one physical node.

Embodiment 3

Figure 5:
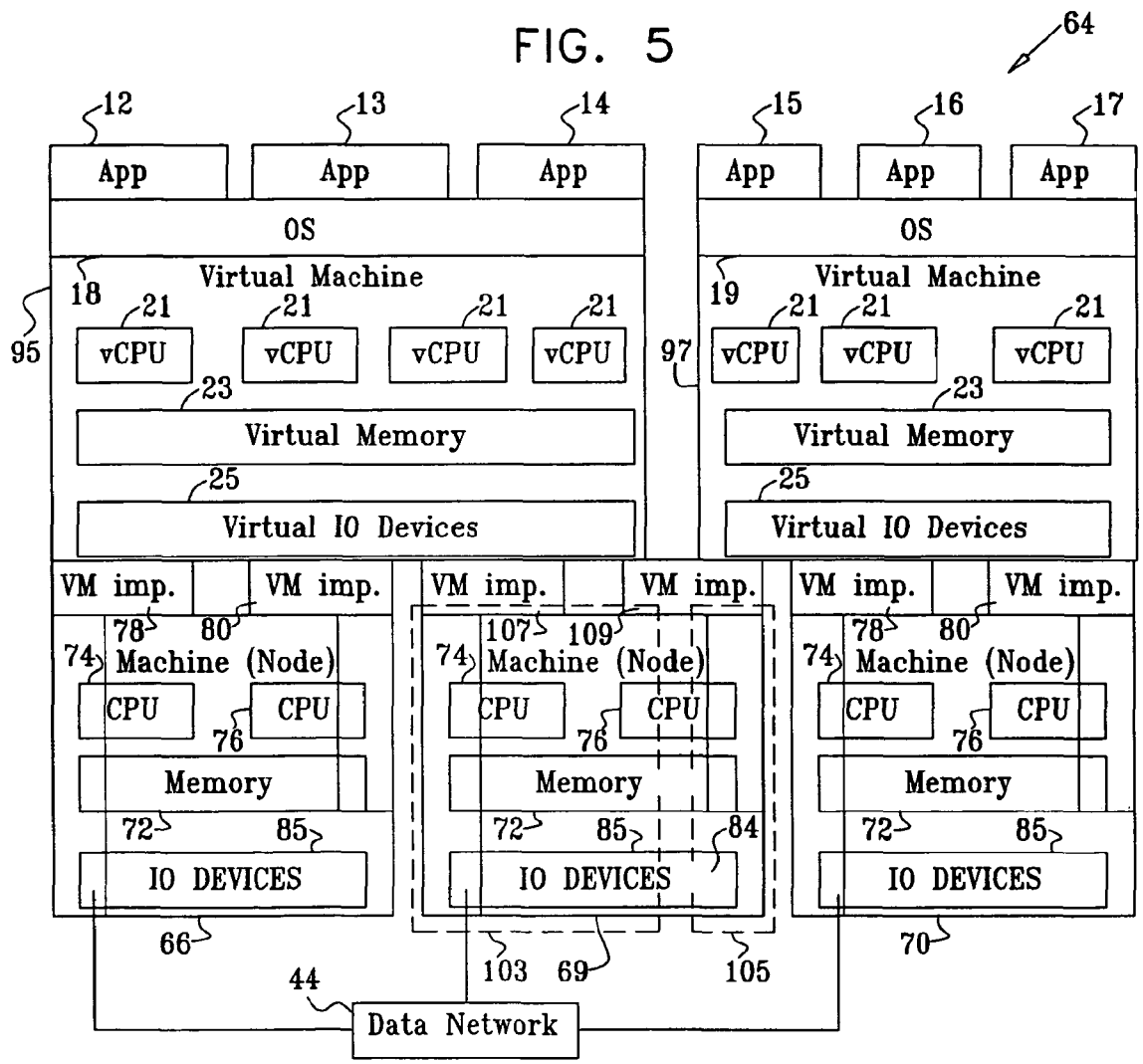
FIG. 5 is a block diagram of a cluster-based virtual computing arrangement employing multiprocessors and virtual nodes having a plurality of virtual machine implementers per CPU that is constructed and operative in accordance with an alternate embodiment of the invention.

Reference is now made to FIG. 5, which is a block diagram of a cluster-based virtual computing system 94 that is constructed and operative in accordance with an alternate embodiment of the invention. The system 94 is similar to the system 64 (FIG. 4), but has even finer granularity. As in the system 64, the system 94 is provided with nodes in which there is more than one virtual machine implementer per physical node. In addition, one physical CPU is used to virtualize a plurality of virtual CPU's, which are distributed in the same or different virtual nodes.

The system 94 has a node 69, which has a hardware configuration that is identical to the node 68 (FIG. 4). However, a virtual machine implementer 107 in the node 69 virtualizes the CPU 74 and participates in a virtual machine 95. A virtual machine implementer 109 virtualizes the CPU 76, and participates in two virtual machines 95, 97. It will be noted that the virtual machine 95 contains four virtual CPU's 21, while the virtual machine 97 has three virtual CPU's 21. A virtual node 103 includes the CPU 74 and shares the CPU 76 with another virtual node 105. Thus, in the system 94, the CPU 76 participates in two virtual nodes 103, 105, and is simultaneously controlled by the two guest operating systems 18, 19. It is the role of the virtual machine implementer to allow such coparticipation in an efficient way.

It is possible to configure the nodes of the system 94 in many combinations. For example, all of the nodes may be configured with a plurality of virtual CPUs per physical CPU, which may belong to same or different virtual nodes. Furthermore, it is possible to increase the number of virtual CPUs virtualized by one single processor beyond those shown in the two virtual machines 95, 97, subject to practical limitations of overhead. Furthermore, the number of virtual nodes sharing one physical node can be increased, again subject to limitations of overhead.

Embodiment 4

Reference is now made to FIG. 6 which is a block diagram of a cluster-based virtual computing system 120 in accordance with a disclosed embodiment of the invention. A plurality of user applications 12, 14, 16 execute simultaneously, supported by the guest operating system 18, which can be any conventional operating system, e.g., Microsoft Windows®, Linux®, Solaris® X86. The guest operating system 18 controls the virtual machine 20, which presents itself to the guest operating system 18 as though it were a conventional real machine.

The system 120 has a plurality of nodes 122, 124, 126, 128. While four nodes are shown, the system 120 is scalable, and any number of nodes may be present, depending on the needs of a particular application and the performance desired. The nodes 122, 124, 126, 128 each comprise computer hardware 28, which in a current embodiment has the X86/IA32 architecture. However, as noted above, the invention is not limited to the X86/IA32 family of processors, but is applicable to other computer architectures. The hardware 28 includes nodal memory 30, and may also be provided with a NIC 130 or other network communications facilities, and with many other types of conventional personal computer I/O devices 132. The nodes 122, 124, 126, 128 may be identically configured. Alternatively, different versions of the X86/IA32 processor may be placed in different nodes. Other aspects of the computer hardware in different nodes may also vary in different nodes, e.g., processor speed, bus speed, memory configuration, and I/O facilities.

In the nodes 122, 126, 128, each of the CPU's is provided with a virtual machine monitor 134. The node 124 is provided with two virtual machine monitors 136, 138, which share the resources of the hardware 28, as shown in the foregoing embodiments.

In this embodiment, the virtual machine monitors 134, 136, 138 are driven entirely by interrupts, and do not schedule for themselves any processing slots. They only react to actions taken by the guest operating system 18 or by the applications 12, 14, 16, and to interrupts generated in the hardware 28.

The virtual machine monitors 134, 136, 138 have a flexible policy for handling faults, exceptions and interrupts depending on their individual characteristics. This may be effected by a mechanism known as "scan before execute", which, as implied by its name, scans the code prior to execution and causes software interrupts to occur at the relevant places. Alternatively, the policy may be effected by a mechanism known as dynamic translation. Both of these techniques scan the code, differentiating between code that can be run natively, i.e., directly on the hardware 28, and the code that should not be run natively. For the latter, the code is altered either to generate a trap to the virtual machine monitor or to jump directly to a virtual machine monitor function. The virtual machine monitor can then emulate a current instruction that should not be run natively. These techniques yield reasonable efficiency, as in practice most code can be run natively and only a small portion need to be emulated. Scanning the code prior to execution is not expensive, as the same code is often run many times, in which case only one scan is needed.

In some cases, the X86/IA32 architecture permits passing faults, exceptions and interrupts to the guest operating system 18 without modification. In other cases, faults, exceptions and interrupts may be hidden from the guest operating system 18. In still other cases, faults, exceptions and interrupts are processed internally by the virtual machine monitors 134, 136, 138, which may direct subsequent actions to be taken with respect to the guest operating system 18. For instance, a new interrupt may be generated and sent to the guest operating system 18 for processing. Generating an interrupt is done by emulating the CPU behavior while getting an interrupt.

For those instructions that require emulation or other modification, an integrated machine emulator, which is part of the virtual machine monitor is used.

Memory Management Subsystem.

Continuing to refer to FIG. 6, memory coherence among the memory 30 of the nodes 122, 124, 126, 128 is achieved by a memory management subsystem 140, which is integrated in the virtual machine implementers 134, 136, 138. The virtual machine implementers 134, 136, 138 are each provided with a memory access hook and I/O access for the memory management subsystem 140. The private network 44 provides rapid internodal communication that is necessary for the operation of the memory management subsystem 140. The virtual machine implementers 134, 136, 138 typically use a paging mechanism when the implementer is implemented as a virtual machine monitor to synchronize the memory 30. Memory caches are established on different nodes 122, 124, 126, 128 in order to allow faster access to recently used segments of the memory 30.

The virtual machine implementers 134, 136, 138 initialize the memory management subsystem 140 using the call INIT( ). During initialization, the memory management subsystem 140 invalidates all local pages of the memory 30 for read and write access.

During subsequent operation, the virtual machine implementers 134, 136, 138 calls the memory management subsystem 140 in order to obtain read or write access to a physical page, which is currently marked as invalid for the specified access type. The memory management subsystem 140 also calls the virtual machine implementers 134, 136, 138 when required in order to invalidate a page for a specified access type, provided that the page should no longer be accessed by the CPU in the hardware 28 for that particular type of access. Alternatively, the page is validated for a specified access type if it has become available for that type of access. The memory management subsystem 140 requests page invalidation or validation using a physical address. Virtual machine monitors, which are used as the virtual machine implementers 134, 136, 138 use a reverse page lookup mechanism in order to update the processor paging table and invalidate the processor translation lookaside buffer (TLB). A description of the interface used for page access control and retrieval by the memory management subsystem 140 is found in Table 2.

TABLE 2

| | |
|---|---|
| INV_PAGE (PHY_ADD, RW) | Invalidate request for a physical page using its physical address and access type |
| VLD_PAGE (PHY_ADD, RW) | Validate request for a physical page using its physical address and access type |
| GET_PAGE (PHY_ADD, RW, BUFFER, LENGTH, OP) | Get read or write access to physical memory address using its physical address and access type. |

In the function GET_PAGE, the parameter RW is a flag indicating the type of access intended. The parameters BUFFER and LENGTH are used to pass data in the case of a write operation and return data for a read operation. In case of read-modify-write operation, the function is called with the parameter RW set to a value of RMW. The parameter OP is processor dependent, and would thus be different in a processor outside the X86/IA32 family. It can indicate any of several operations, for example, increment, decrement, store and return previous value, and test and set.

For embodiments in which one or more emulators are used as the virtual machine implementers 134, 136, 138, the above techniques can also be used. The virtual machine implementers 134, 136, 138 in such embodiments call the memory management subsystem 140 each time physical memory access is needed. An API MEM_ACCESS(PHY_ADD, RW) provides memory access for a physical page using its physical address and access type as a replacement for the CPU paging mechanism used in the virtual machine monitor.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

Appendix 1

The computer software on the compact disks containing the computer program listing appendix hereof may be installed and executed as follows:
Hardware.
Provide an IBM compatible personal computer with a minimum of 512 MB RAM and an Intel Pentium IV central processing unit, two IDE hard disks with a minimum of 40 Gigabytes of disk space. Each IDE hard disk should be connected to its own individual IDE controller.
Software (Installation).
Host Operating System (Located on the First IDE Controlled Hard Disk).
Copy the file.CONFIG in the root folder stored in the appended CD-ROM into a temporary directory.
Install the Linux 2.4.20 kernel available from Redhat, Corporate HQ: 1801 Varsity Drive, Raleigh, N.C. 27606, USA.
Install and Compile the Linux 2.4.21 kernel patch available from Kernel Dot Org Organization, 3990 Freedom Circle, Santa Clara, Calif. 95054, USA using the.CONFIG file mentioned above.
Add the mem=200M argument to the Linux boot command and reboot the Computer.
Copy the files BIOS.HEX, SCMPVMMO.HEX, SCMPVMMS.HEX and USERMODE.HEX in the root folder stored in the appended CD-ROM into a temporary directory.
Unhex the computer listing BIOS.HEX, SCMPVMMO.HEX, SCMPVMMS.HEX and USERMODE.HEX using HEX IT V1.8 or greater by John Augustine, 3129 Earl St., Laureldale, Pa. 19605, USA creating the files BIOS, SCMPVMM.O, SCMPVMM.SH and USERMODE, respectively.
Guest Operating System (Located on the Second IDE Controlled Hard Disk).
Install the Linux 2.4.20 kernel available from Redhat, Corporate HQ: 1801 Varsity Drive, Raleigh, N.C. 27606, USA.
Install and Compile the Linux 2.4.21 kernel patch available from Kernel Dot Org Organization, 3990 Freedom Circle, Santa Clara, Calif. 95054, USA using the above-noted.CONFIG file.
Reboot the Computer.
Running Instructions.
The system should be run by a user with supervisor privileges on the Linux system (typically root).
The system must be run from a text mode screen (not from within a X-windows terminal) on the host.
Run the scmpvmm.sh shell script with a single parameter of start.
Typically 'sh scmpvmm.sh start'
Run the usermode program, Typically './usermode'.
The invention claimed is:
1. A computer system, comprising:
a cluster of computing nodes, each computing node comprising:
a physical memory;
a network interface device, which connects the computing node to a network interconnecting the computing nodes in the cluster; and
at least one CPU, which is configured to run a respective virtual machine implementer program on at least one of the computing nodes, while communicating via the network interface device with other computing nodes in the cluster and supporting a shared virtual machine implemented concurrently on two or more of the computing nodes, wherein a guest operating system runs on the shared virtual machine, which presents a single coherent shared memory to the guest operating system using the physical memory that is distributed across multiple nodes, and
wherein the virtual machine implementer program running on the at least one of the computing nodes is configured, when a segment of the shared memory of the virtual machine that is required on the at least one of the computing nodes is invalid, to cause a migration of the segment via the network to the at least one of the computing nodes from another computing node having a valid copy of the segment in the physical memory on the other computing node.

2. The system according to claim 1, wherein the computing nodes are configured to support the shared virtual machine so that a software application running over the guest operating system need not be cluster-aware.

3. The system according to claim 1, wherein the at least one CPU comprises multiple CPUs, which run the virtual machine implementer program.

4. The system according to claim 1, wherein the shared virtual machine includes a plurality of virtual CPUs, which are controlled by the guest operating system.

5. The system according to claim 1, wherein the virtual machine implementer program on the at least one of the nodes comprises multiple virtual machine implementer programs, which are configured to provide multiple, respective virtual nodes, and wherein the virtual machine is supported by the virtual nodes.

6. The system according to claim 1, wherein the computing nodes comprise physical peripheral component interconnect controllers, and wherein the virtual machine implementer program comprises a virtual peripheral component interconnect controller, which serves as a proxy between the guest operating system and the physical peripheral component interconnect controllers.

7. The system according to claim 6, wherein the virtual peripheral component interconnect controller is configured to emulate hot-pluggable events for the guest operating system, so as to allow dynamic addition and removal of one or more of the nodes while running the shared virtual machine and the guest operating system.

8. The system according to claim 1, wherein the at least one CPU is configured to apply memory mirroring across the multiple nodes.

9. The system according to claim 1, wherein the virtual machine implementer program maintains mirrors of the memory used by the guest operating system in each of the nodes, and is configured to write-invalidate at least a portion of a page of the memory in one of the nodes and to transfer a valid copy of the portion of the page to the one of the nodes from another of the nodes via the network.

10. A method for computing, comprising:
providing a cluster of computing nodes interconnected by a network, each computing node comprising at least one CPU, a physical memory, and a network interface device, which connects the computing node to the network interconnecting the plurality of the computing nodes; and
running a respective virtual machine implementer program on the at least one CPU in at least one of the computing nodes, while communicating with other computing nodes in the cluster via the network interface device and supporting a shared virtual machine implemented concurrently on two or more of the computing nodes, wherein a guest operating system runs on the shared virtual machine, which presents a single coherent shared memory to the guest operating system using the physical memory that is distributed across multiple nodes, and
wherein the virtual machine implementer program running on the at least one of the computing nodes is configured, when a segment of the shared memory of the virtual machine that is required on the at least one of the computing nodes is invalid, to cause a migration of the segment via the network to the at least one of the computing nodes from another computing node having a valid copy of the segment in the physical memory on the other computing node.

11. The method according to claim 10, wherein running the respective virtual machine implementer program comprises supporting the shared virtual machine so that a software application running over the guest operating system need not be cluster-aware.

12. The method according to claim 10, wherein running the respective virtual machine implementer program comprises running virtual machine implementer programs on multiple CPUs in each of the two or more of the computing nodes.

13. The method according to claim 10, wherein the shared virtual machine includes a plurality of virtual CPUs, which are controlled by the guest operating system.

14. The method according to claim 10, wherein running the respective virtual machine implementer program comprises running, on at least one of the nodes, multiple virtual machine implementer programs, which are configured to provide multiple, respective virtual nodes, and wherein the virtual machine is supported by the virtual nodes.

15. The method according to claim 10, wherein the computing nodes comprise physical peripheral component interconnect controllers, and wherein running the respective virtual machine implementer program comprises running a virtual peripheral component interconnect controller, which serves as a proxy between the guest operating system and the physical peripheral component interconnect controllers.

16. The method according to claim 15, and comprising emulating, using the virtual peripheral component interconnect controller, hot-pluggable events for the guest operating system, so as to allow dynamic addition and removal of one or more of the nodes while running the shared virtual machine and the guest operating system.

17. The method according to claim 10, and comprising applying memory mirroring across the multiple nodes, using the virtual machine implementer program running on the at least one CPU.

18. The method according to claim 17, wherein applying the memory mirroring comprises maintaining mirrors of the memory used by the guest operating system in each of the nodes, write-invalidating at least a portion of a page of the memory in one of the nodes, and transferring a valid copy of the portion of the page to the one of the nodes from another of the nodes via the network.

19. A computer software product, comprising a non-transitory computer-readable medium in which program instructions are stored, which instructions are configured to run on a cluster of computing nodes, each computing node including a physical memory, a network interface device, which connects the computing node to a network interconnecting the computing nodes in the cluster, and at least one CPU,
wherein the instructions cause the at least one CPU on at least one of the computing nodes to run a respective virtual machine implementer program on the computing node, while communicating via the network interface device with other computing nodes in the cluster and supporting a shared virtual machine implemented concurrently on two or more of the computing nodes, wherein a guest operating system runs on the shared virtual machine, which presents a single coherent shared memory to the guest operating system using the physical memory that is distributed across multiple nodes, and
wherein the virtual machine implementer program running on the at least one of the computing nodes is configured, when a segment of the shared memory of the virtual machine that is required on the at least one of the computing nodes is invalid, to cause a migration of the segment via the network to the at least one of the computing nodes from another computing node having a valid copy of the segment in the physical memory on the other computing node.

20. The product according to claim 19, wherein the instructions cause the computing nodes to support the shared virtual machine so that a software application running over the guest operating system need not be cluster-aware.

21. The product according to claim 19, wherein the at least one CPU includes multiple CPUs, and wherein the instructions cause the multiple CPUs to run the virtual machine implementer programs.

22. The product according to claim 19, wherein the shared virtual machine includes a plurality of virtual CPUs, which are controlled by the guest operating system.

23. The product according to claim 19, wherein the virtual machine implementer program on the at least one of the computing nodes comprises multiple virtual machine implementer programs, which cause the at least one of the computing nodes to provide multiple, respective virtual nodes, and wherein the virtual machine is supported by the virtual nodes.

24. The product according to claim 19, wherein the computing nodes include physical peripheral component interconnect controllers, and wherein the instructions cause the at least one of the computing nodes to provide a virtual peripheral component interconnect controller, which serves as a proxy between the guest operating system and the physical peripheral component interconnect controllers.

25. The product according to claim 19, wherein the virtual peripheral component interconnect controller is configured to emulate hot-pluggable events for the guest operating system, so as to allow dynamic addition and removal of one or more of the nodes while running the shared virtual machine and the guest operating system.

26. The product according to claim 19, wherein the instructions cause the at least one CPU to apply memory mirroring across the multiple nodes.

27. The product according to claim 26, wherein the instructions cause the computing nodes to maintain mirrors of the memory used by the guest operating system in each of the nodes, and to write-invalidate at least a portion of a page of the memory in one of the nodes and to transfer a valid copy of the portion of the page to the one of the nodes from another of the nodes via the network.

* * * * *